United States Patent [19]
Volz et al.

[11] Patent Number: 4,843,288
[45] Date of Patent: Jun. 27, 1989

[54] PHASE LOCKED MOTOR CONTROL SYSTEM FOR MULTIPLE DISK DRIVE UNITS

[75] Inventors: Le Roy A. Volz, Northridge; Daniel R. Vigil, Panorama City, both of Calif.

[73] Assignee: Rigidyne Corporation, Simi Valley, Calif.

[21] Appl. No.: 174,079

[22] Filed: Mar. 28, 1988

[51] Int. Cl.$^4$ .............................................. H02P 5/16
[52] U.S. Cl. .................................... 318/599; 318/606; 318/636; 318/254; 388/901; 388/910; 388/911; 388/915; 388/811
[58] Field of Search ............... 318/315, 254, 341, 317, 318/327, 311

[56] References Cited

U.S. PATENT DOCUMENTS

| | | | |
|---|---|---|---|
| 3,355,649 | 11/1967 | Boylan et al. | 318/315 X |
| 3,418,304 | 11/1973 | Iwai | 318/311 |
| 3,883,785 | 5/1975 | Fulcher et al. | 318/254 |
| 4,109,184 | 8/1978 | Weber | 318/327 |
| 4,193,020 | 3/1980 | Song | 318/314 |
| 4,734,630 | 3/1988 | Okano | 318/341 |
| 4,739,230 | 4/1988 | Sonobe et al. | 318/317 X |

*Primary Examiner*—Benjamin Dobeck
*Attorney, Agent, or Firm*—Kelly, Bauersfeld & Lowry

[57] ABSTRACT

A motor control system and related method are provided for phase and frequency locked operation of multiple spindle motors in a computer disk drive environment or the like, for coupling two or more disk drive units together to provide expanded data storage capability. The control system comprises a hybrid digital and analog network for producing a pulse width modulated control signal to control a disk drive spindle motor in a manner achieving frequency and phase locked relation with a reference signal. Multiple spindle motors are similarly driven in relation with the same reference signal, whereby the spindle motors are frequency and phase locked with respect to each other to permit, for example, parallel data transfer among the multiple disk drive units.

30 Claims, 5 Drawing Sheets

FIG. 7
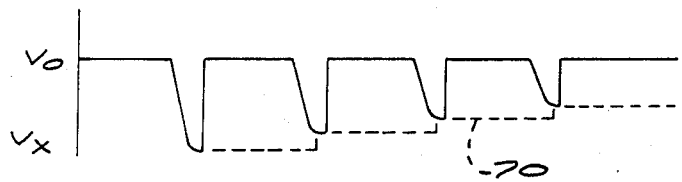
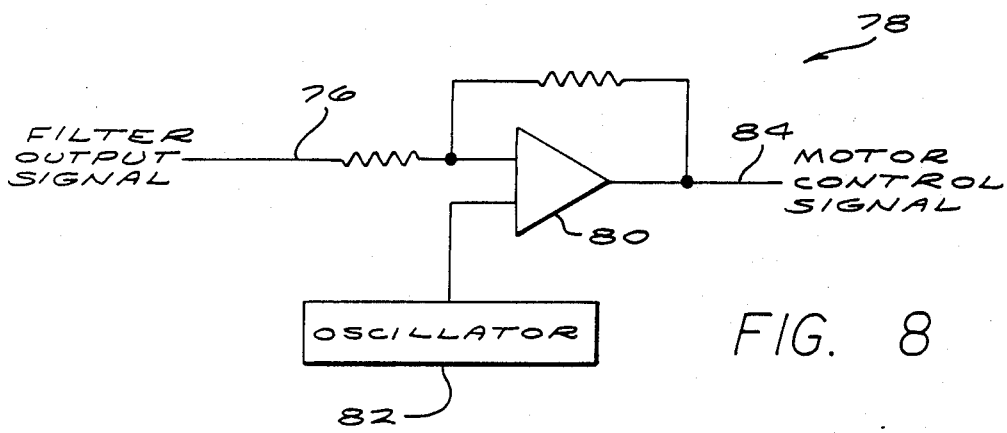
FIG. 8
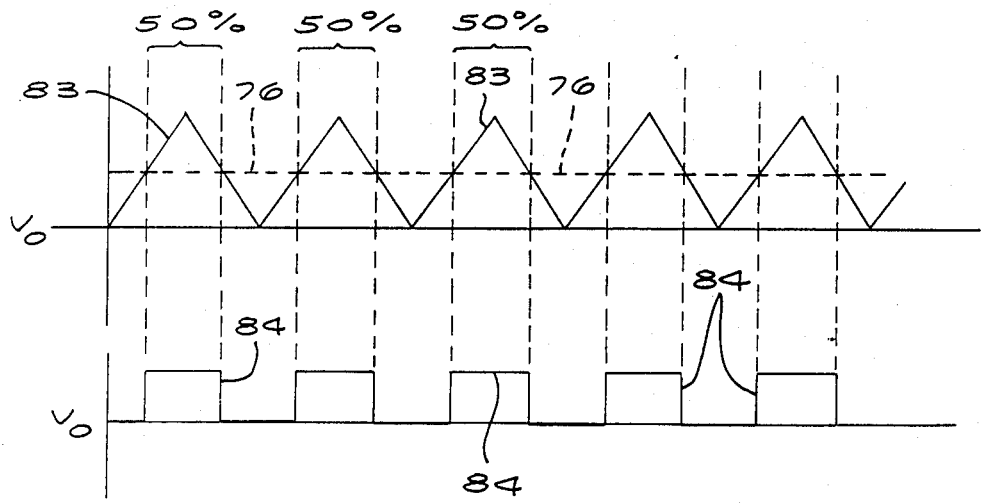
FIG. 9

PHASE LOCKED MOTOR CONTROL SYSTEM FOR MULTIPLE DISK DRIVE UNITS

BACKGROUND OF THE INVENTION

This invention relates generally to systems for controlling the operation of disk drive units in a computer environment or the like. More particularly, this invention relates to an improved, relatively simple, and relatively economical control system and method for concurrently operating multiple disk drive units in a manner providing a significantly expanded data storage capability.

In recent years, microcomputer equipment particularly such as so-called personal and desk top computers have become extremely popular for a wide variety of business and educational and other uses. Such computers commonly include a main central processor unit having one or more memory storage disks for storage of data. In many modern computers, the storage disk or disks are often provided in the form of "hard" disks as part of a Winchester-type disk drive unit having the storage disks supported in a stack on a common rotary spindle within a substantially sealed disk drive housing. The disks are rotatably driven in unison by a small spindle motor within the disk drive housing, and one or more electromagnetic heads are displaced by a head positioner assembly to traverse surfaces of the rotating disks for purposes of reading and writing data. Such Winchester-type disk drive units have been produced relatively economically for general purposes microcomputer applications. When the disk drive unit is equipped with multiple memory storage disks, the total disk surface area is increased to result in an increased data storage capacity. For example, Winchester-type disk drive units for personal computer applications are currently available with from one to four disks providing data storage capacities in the range of about 5-40 megabytes.

In some specialized applications of personal computers and the like, there is a demand for a significantly expanded data storage capacity. However, practical cost and standardized size constraints have generally prohibited provision of significantly expanded memory capacities, for example, in the range of 75-80 megabytes and higher, in the personal computer environment. By contrast, such memory capacities are available in larger, so-called main frame computers either by the use of significantly larger Winchester disk drive units having a substantially increased number of data storage disks, or by the use of costly digital electronic control arrangements for linking multiple disk drive units in frequency and phase locked relation to permit function as a common memory bank. These approaches to expanded data capacity, however, are generally recognized as impractical in a personal or desk top computer environment as a result of cost and/or size restrictions.

There exists, therefore, a significant need for a system and method for achieving substantial increases in data storage capacity in personal type computer equipment, in a cost- and space-efficient manner. The present invention fulfills these needs and provides further related advantages.

SUMMARY OF THE INVENTION

In accordance with the invention, a relatively simple and economical system and method are provided for controlled rotatable driving of a computer disk drive unit or the like to permit multiple disk drive units to be interconnected in a manner yielding a significantly expanded data storage capacity. The invention is designed particularly for use in a microcomputer environment such as personal and desk top computers and the like. The system operates multiple disk drive units in rotational frequency and phase locked relation to permit, for example, parallel data transfer, and thereby correspondingly permit the multiple disk drive units to emulate a data storage base of significantly expanded data storage capacity.

In accordance with a preferred form of the invention, the control system is incorporated into the motor control of the spindle drive motor of each disk drive unit. The control system regulates spindle motor operation to insure rotational frequency and phase matching with a selected reference signal. When multiple disk units are operated in frequency and phase locked relation with the same reference signal, the associated memory storage disks of the multiple disk drive units are rotated in matched frequency/phase relation. The control system for each unit generates a pulse width modulated control signal having a duty cycle related to actual spindle motor frequency and phase for correspondingly adjusting the operation of the spindle motor as required to achieve frequency and phase lock with the reference signal.

The preferred control system includes a combination of digital and analog components for generating the desired pulse width modulated control signal. More particularly, a digital error detector receives the reference signal in the form of a regular succession of pulses obtained, for example, from an appropriate clock, wherein the pulses are typically generated at 60 hertz to yield a target spindle motor speed of 3,600 rpm. Each reference signal pulse identifies the desired start point of spindle motor rotation for each revolution. The reference signal is compared with an actual motor frequency (speed) and phase signal obtained, for example, by detection of servo index pulses on one or more of the memory storage disks of the disk drive unit. These servo index pulses represent the actual start point for each revolution of the spindle motor. The error detector responds digitally to this comparison to generate an output error signal at one of two different output ports, depending upon the actual motor speed and phase relative to the reference signal. When the frequencies of the motor and the reference signal substantially match, the error detector produces the output error signal in pulse width modulated form. This modulated error signal is applied to one of the two output ports, depending upon the leading or trailing phase relation of the motor, and with a duty cycle proportional to the phase error.

The output error signal from the error detector is coupled ot an analog sample circuit including analog switches driven in accordance with the error signal duty cycle and a time interval integrator to provide a succession of ramp signals having periods proportional to the error signal duty cycle, and a polarity according to the trailing or leading characteristics of the error relative to the reference signal. The ramp signals are transferred in succession to a charge circuit to produce an averaged analog error signal having a magnitude proportional to the detected error. In the preferred form, this analog error signal is coupled to a loop filter circuit which is suitably designed to modify the signal for predetermined dynamic response characteristics at selected frequency ranges. A resultant filtered analog error signal is coupled in turn to a modulator having an oscillator and means for comparing the filtered analog error signal with an oscillator signal to produce the pulse width modulated motor control signal, having a duty cycle reflective of phase or frequency error. The motor control signal is supplied to a commutation logic circuit for driving the spindle motor in a manner achieving frequency and phase lock operation.

The commutation logic circuit controls the operation of a power stage circuit which, in the preferred form, comprises a CMOS network of "N" and "P" channel MOSFETs connected between a power source and ground. The MOSFETs comprise low resistance, low heat switches for power-efficient commutation of the typically three phase spindle motor at the target frequency and phase, in accordance with the generated pulse width modulated motor control signal. The pulse width modulated motor control signal applied to the commutation logic circuit functions to control the timing and sequence of operation of the MOSFET switches to achieve phase and frequency locked operation with the reference signal.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 7 is a graphic representation of an analog error signal produced by the sample circuit;

FIG. 8 is another schematic circuit diagram generally depicting a modulator circuit for the control system;

FIG. 9 is a graphic representation of the operation of the modulator circuit to produce a pulse width modulated motor control signal.

DETAILED DESCRIPTION OF THE PREFERRED EMBODIMENT

Figure 1:
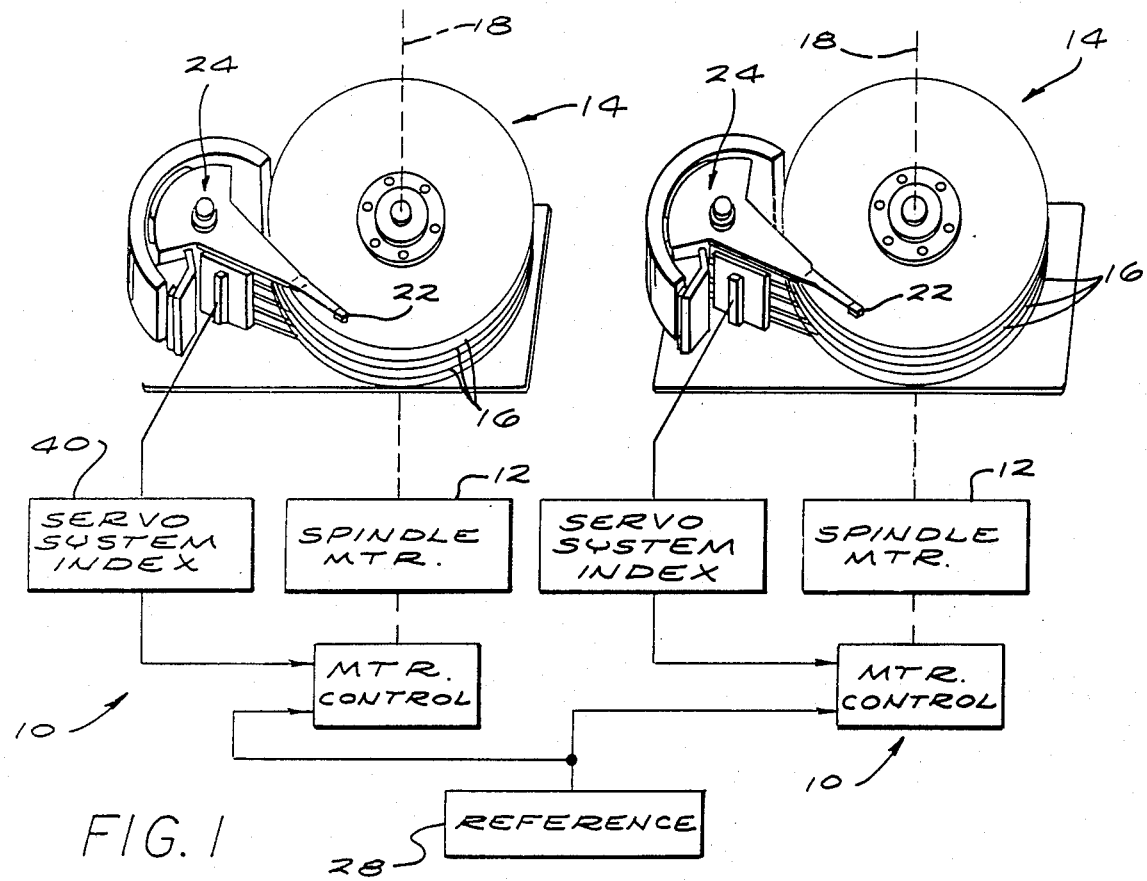
FIG. 1 is a diagrammatic view illustrating multiple computer disk drive units including the phase locked motor control system embodying the novel features of the invention.

As shown in the exemplary drawings, a motor control system referred to generally in FIG. 1 by the reference numeral 10 is provided for operating the spindle drive motors 12 of multiple computer disk drive units 14 or the like in frequency and phase locked relation. The control system 10 provides a relatively simple and economical circuit arrangement for concurrent driving of the disk drive units 14 in a manner permitting those disk drive units to emulate a data storage system of significantly expanded data storage capacity.

The phase locked motor control system 10 is designed particularly for use in modern microcomputer equipment such as in personal and desk top computer applications and the like. The system 10 permits two or more disk drive units 14 to be operated simultaneously for parallel data transfer during read and/or write steps, under the control of a suitable controller (not shown), whereby the disk drive units 14 may be operated as a common data base. As a result, the data storage capacity can be significantly increased without requiring disk drive units of a specialized size or construction or data capacity. Instead, standard commercial disk drive units can be used to double or triple, etc., the total data storage capacity of a microcomputer station, in accordance with the number of disk drive units operated in frequency and phase locked relation.

As depicted diagrammatically in FIG. 1, each of the disk drive units 14 comprises a so-called Winchester-type disk drive having one or more "hard" memory storage disks 16 mounted for rotation about a common spindle axis 18. A spindle motor 12 for each disk drive unit rotatably drives the disk or disks 16 in unison at a prescribed rotational speed, typically 3,600 rpm, during disk drive operation. One or more electromagnetic heads 22 are mounted in close overlying relation with the disk or disks 16 for use in reading and/or writing data in concentric tracks on prepared magnetizable disk surfaces, all in a well known manner. These heads 22 are normally carried by a head positioner assembly 24 adapted for displacing the heads through radial traverses of the disks for purposes of seeking and/or accessing selected data tracks, again in a manner known in the art. All of these disk drive components are normally encased within a substantially sealed disk drive housing (not shown).

In general terms, the phase locked motor control system 10 of the present invention is provided as part of each individual disk drive unit 14. The system 10 includes means for detecting the actual rotating frequency (speed) and phase of the associated spindle motor 12 and the disks 16 carried thereby, and for comparison thereof with a target or reference signal 28 of predetermined frequency and phase. This comparison, when processed by the circuit components of the invention, yields a resultant pulse width modulated motor control signal used to control motor driving to obtain and maintain a frequency and phase locked relation with the reference signal 28. When more than one disk drive unit 14 is locked with the same reference signal 28 for matched frequency and phase operation, the disk drive units 14 are correspondingly locked with each other to permit parallel data transfer such that the disk drive units 14 cooperate to emulate a single data storage base of larger size.

Figure 2:
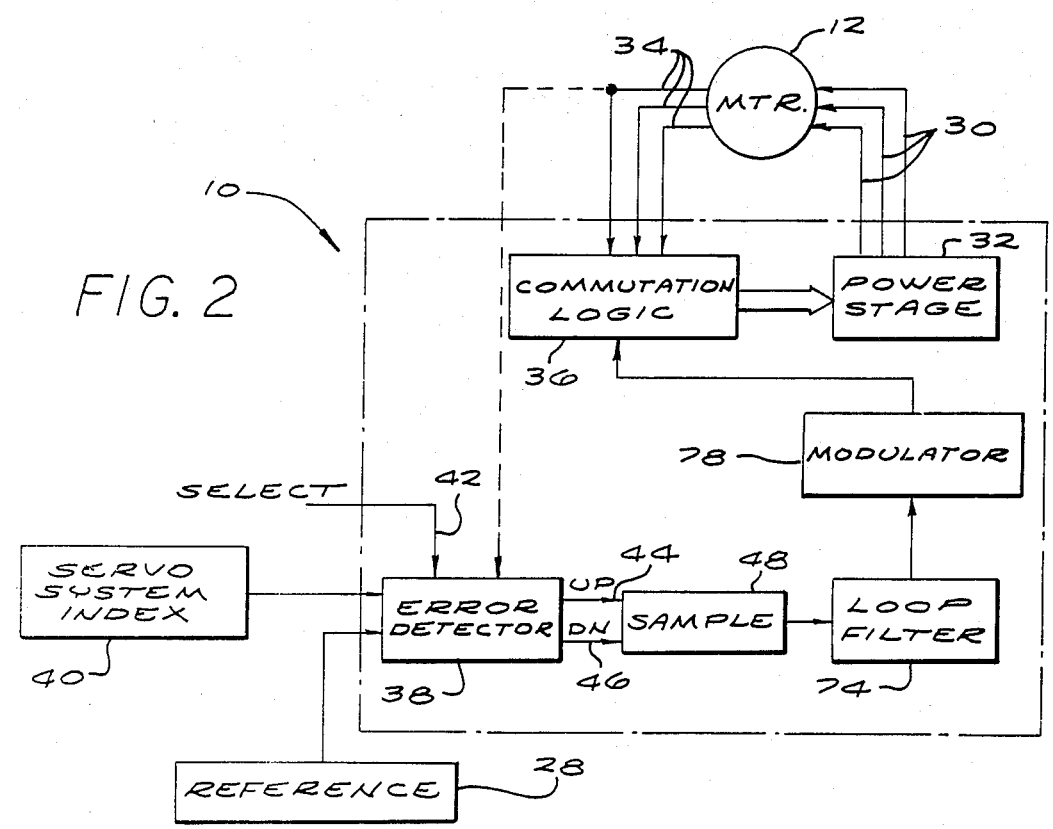
FIG. 2 is a block diagram further depicting the functional circuit stages of the motor control system for one disk drive unit.

FIG. 2 depicts in block form the general functional stages of the motor control system 10 for operating a spindle motor 12 of a disk drive unit 14. As shown, the motor 12 comprises a three phase dc motor of the type typically used in computer disk drive applications. Power is supplied to the three motor phases via a trio of conductors 30 from an appropriate power stage circuit 32, the preferred construction of which will be described in more detail. Commutation feedback signals are obtained from the motor 12 via another trio of conductors 34, wherein these commutation signals are conventionally obtained through the use of Hall-sensor switches (not shown) incorporated into the motor to detect motor speed and phase. The commutation signals are coupled by the conductors 34 to a commutation logic circuit 36 which decodes those signals for regulating the operation of the power stage 32 in a manner obtaining controlled driving of the spindle motor 12 at a specified speed, typically at 3,600 rpm in a computer disk drive application. The specific construction of the commutation logic 36 used with the motor 12 is common and well known in the art of three phase dc motors.

The motor control system 10 of the present invention functions to insure motor speed or rotational frequency at the desired target speed by comparison of actual motor speed with the reference signal 28. When the motor speed substantially matches the reference signal frequency, the system 10 functions further to adjust the phase of motor rotation for phase locked rotation with the reference signal phase. In this manner, the start point of rotation of the spindle motor 12 and the motor rotational speed are fully synchronized with the reference signal.

More particularly, the system 10 includes a digital error detector circuit 38 for comparing the actual motor speed and phase with the reference signal 28, and for generating an output error signal with selected characteristics according to the magnitude and direction of any discrepancies. This error detector 38 responds to the reference signal 28 which may comprise a suitable clock pulse obtained internally or externally and, for sake of convenience, preferably has a regular frequency of 60 hertz to correlate directly with a standard target motor speed of 3,600 rpm during normal operation.

The error detector 38 also receives an appropriate feedback signal representing actual motor speed and phase. During initial start-up of motor rotation, this signal may be obtained by connection to one of the Hall-sensor switch conductors 34 (FIG. 2), since the Hall-sensor switches (not shown) within the motor generate electrical pulse signals in relation to motor speed and phase. In this regard, the error detector 38 may be adapted for use with Hall-sensor switches of either the differential voltage type or the open collector output type. Alternately, particularly when the motor 12 is rotating at or near the desired speed for steady state operation, an appropriate servo index pulse signal obtained by detection of servo bits on a servo surface of one of the rotating disks 16 can be applied to the error detector 38, wherein the servo index pulses represent the start point of each revolution of the disks and motor, and thereby may be monitored to track motor speed and phase. The servo index pulse signal is, of course, detected by appropriate servo system elements 40 which are conventionally provided as part of the disk drive unit in association with the controller (not shown) and the head positioner assembly 24 (FIG. 1). A select port 42 may be provided with the error detector 38 to permit controlled switching between the Hall-sensor signal and the servo index signal during different operating conditions, as desired.

Figure 3:
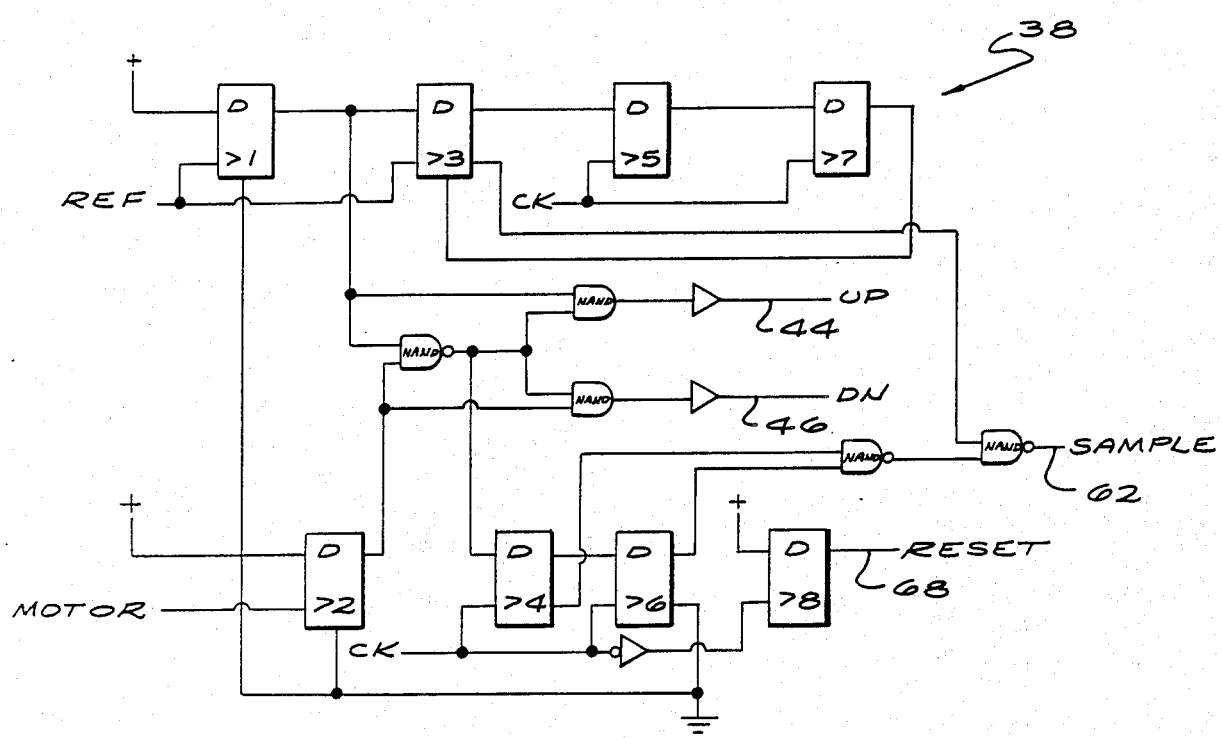
FIG. 3 is a logic circuit diagram illustrating an exemplary digital error detector circuit.

One exemplary error detector logic circuit is shown in FIG. 3, although it will be understood that the specific construction and internal operation of the circuit may vary widely to achieve the same functional output. In this regard, the exemplary logic circuit of FIG. 3 will be described only briefly, and in general terms to include a plurality of bistable flip-flops labelled respectively "1" through "8", in combination with NAND gates and inverters for purposes of providing an output error signal on one of two different output ports 44 and 46 labelled respectively "UP" and "DN" (down). The application of the reference signal 28 and feedback signal (e.g., servo index) pulses to the logic circuit effectively switches the flip-flops in a manner yielding the output error signal at the "UP" port 44 when motor speed or phase trails (lags) the reference signal, or yielding the output error signal at the "DN" port 46 when the motor speed or phase leads the reference signal. Accordingly, the presence of the output error signal at the port 44 or the port 46 indicates the direction or polarity of frequency or phase error. The specific signal characteristics of the output signal reflect the presence of frequency error, or, in the alternative, the presence and magnitude of phase error.

Figure 5:
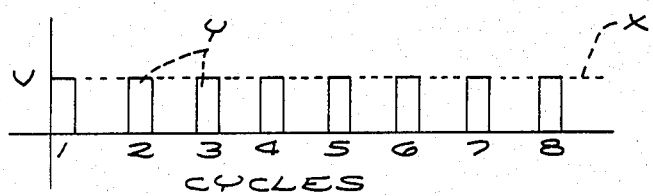
FIG. 5 is a graph depicting one exemplary output output error signal produced by the error detector circuit.
Figure 4:
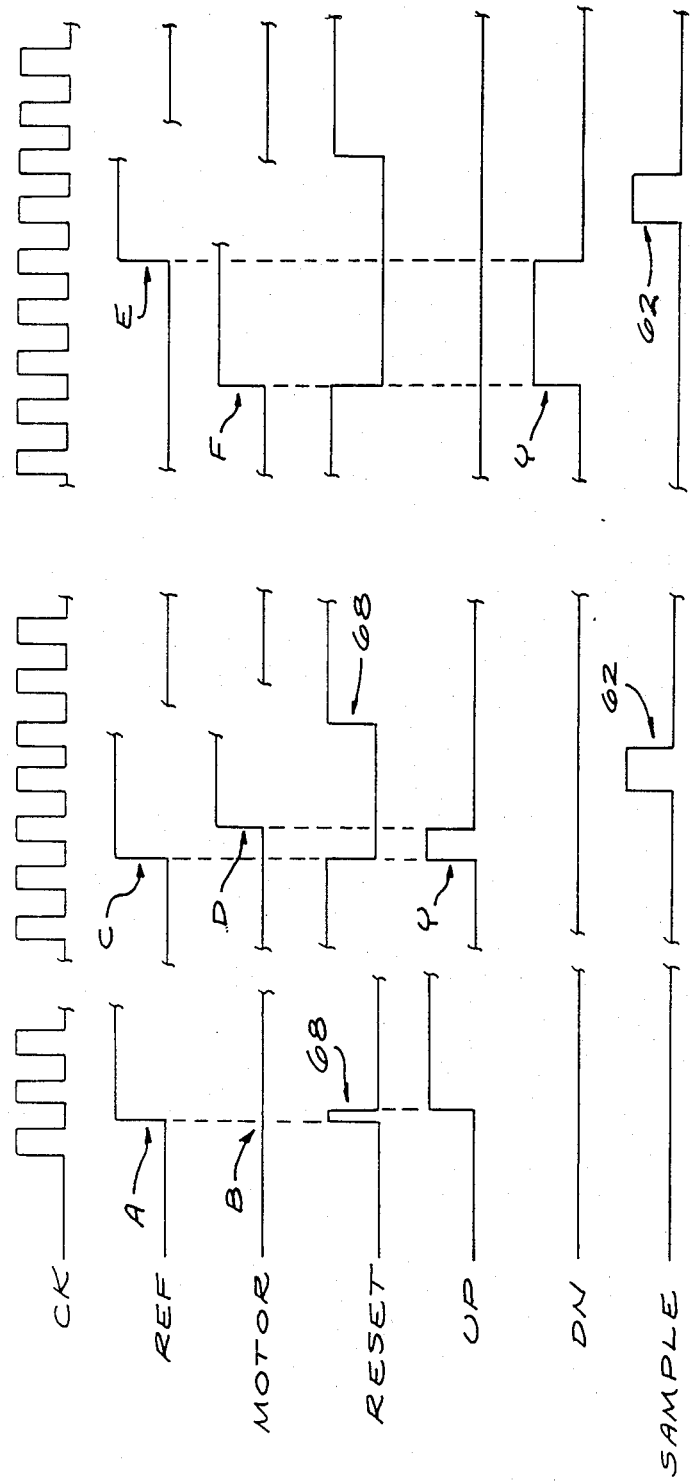
FIG. 4 is a graphic representation depicting general operation of the error detector circuit.

More specifically, the reference signal 28 and feedback signal, such as the servo index pulse signal, are applied to separate flip-flops of the logic circuit. As represented graphically in FIG. 4, the presence of a pulse at the associated flip-flop causes the device to change state. For example, as referenced by arrow "A" in FIG. 4, a change of state of the flip-flop "1" is caused by a reference signal pulse indicative of a target start point and time for a motor revolution. When that change of state of the flip-flop "1" is not regularly accompanied by a corresponding change of state of the flip-flop "2" due to the absence of an incoming motor signal pulse, as represented at arrow "B" in FIG. 4, a phase error is detected by the logic circuit. In a typical case, such as during start-up of the disk drive unit, the motor phase and frequency will lag the reference frequency and result in a constant output error signal "X" at the "UP" output port 44, as viewed in FIG. 5, wherein the constant nature of the output error signal reflects the frequency error. However, in the event the motor frequency leads the reference frequency, a significantly greater number of motor signal pulses will be detected, in comparison with reference signal pulses, to result in a constant output error signal "X" at the "DN" output port 46.

When the motor frequency is at or near the frequency of the reference signal 28, but a phase error exists, the flip-flops "1" and "2" will change state at points spaced slightly in time. Moreover, the order in which these flip-flops "1" and "2" change state will indicate the polarity or direction of the phase error. For example, as illustrated by arrows "C" and "D" in FIG. 4, a phase lagging motor will result in state change of the flip-flop "2" slightly after the flip-flop "1". When such phase lag exists, the logic circuit times the span between the pulses to produce a pulse width modulated type output error signal "Y" (FIG. 5) at the "UP" output port 44. Conversely, as depicted by arrows "E" and "F" in FIG. 4, a phase leading motor will result in state change of the flip-flop "2" slightly before the flip-flop "1". In this latter condition, the logic circuit produces the same pulse width type signal "Y" having a timed relation according to the phase lead but at the "DN" output port 46. Accordingly, frequency error is indicated by the presence of a full duty cycle error signal at the output port 44 or 46, depending upon the direction of the error, whereas phase error is indicated by the presence of a partial duty cycle error signal at the output port 44 or 46.

Figure 6:
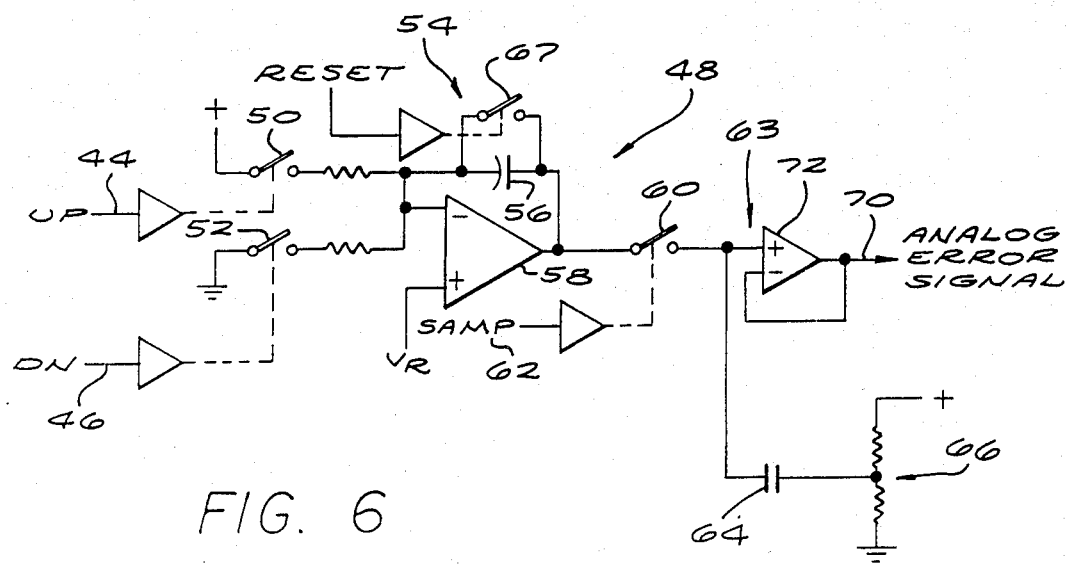
FIG. 6 is a schematic circuit diagram illustrating a sample circuit forming part of the control system.

The output error signal from the error detector 38 is applied to a sample circuit 48, as viewed schematically in FIG. 6. In general terms, this sample circuit 48 includes a pair of analog input switches 50 and 52 driven by the output error signal to produce an analog error signal representative of frequency or phase error.

More particularly, the first analog switch 50 is coupled to a positive reference voltage, whereas the second analog switch 52 is coupled to ground. Both switches 50 and 52 are coupled in turn through resistors and a common summing junction to a time interval integrator circuit 54 having a charging capacitor 56 coupled across an operational amplifier 58 for storing a charge applied thereto when the appropriate switch 50 or 52 is closed. The first analog switch 50 is adapted to be closed in response to an output error signal at the "UP" port 44. Conversely, the second switch 52 is adapted to be closed in response to an output error signal at the "DN" port 46.

In the illustrative sample circuit 48, the charging capacitor 56 will produce a ramp signal in response to closure to either analog switch 50 or 52. When the motor frequency lags the reference frequency, this ramp signal will decrease to a minimum voltage level as the associated analog switch 50 is held closed by the constant output error signal applied thereto. Alternately, when the motor frequency leads the reference frequency, an increasing ramp signal results with the signal again reaching a maximum voltage level due to the associated analog switch 52 being held in the closed position by the constant output error signal. A switch 60 is closed in a repetitive fashion by a cyclic sample signal 62 produced by the error detector 38 (FIG. 3) preferably at a rate of 60 hertz and for a closure time sufficient to transfer the accumulated charge of the charging capacitor 56 to a series-connected store portion 63 of the sample circuit 48 including a resistor-capacitor network having a storage capacitor 64. This storage capacitor 64 advantageously has its reference side coupled between resistors of a voltage divider 66 which functions to offset and thus reduce or rejects the effects of system noise, which might otherwise be present in the spindle motor system. After charge transfer and associated opening of the sample switch 60, the integrator circuit 54 is reset by momentary closure of a reset switch 67 in response to a reset signal 68 generated by the error detector logic circuit (FIG. 3).

When the motor frequency and reference frequency are substantially matched, the error detector 38 as previously described produces a pulse width type signal at the appropriate "UP" or "DN" output port. This signal results in ramping up or down, as appropriate, of the charge at the charging capacitor 56, with a downward ramp representative of phase lag being depicted by way of example in FIG. 7. The ramp proceeds for the duration of the duty cycle of the output error signal, as reflected by the time of closure of the appropriate analog switch 50 or 52. The resultant charge is then transferred to the storage capacitor 64 by closure of the sample switch 60, as previously described. The storage capacitor 64 samples and stores the peaks of the succession of ramp signals to produce an analog error signal 70 as represented by dotted lines in FIG. 7 with respect to a phase lag condition, wherein this signal remains constant between charge transfer events and then may change in increments as the phase error is reduced by the control system.

The analog error signal from the sample circuit 48 thus represents the direction of motor frequency error (high or low), or, if the motor is operating near the desired rotational frequency, the analog error signal represents the magnitude and direction of motor phase error relative to the reference signal. This analog error signal is coupled through a buffer amplifier 72 (FIG. 6) to a loop filter circuit 74 (FIG. 2) for tailoring and controlling the selected dynamic response characteristics of the system. The specific construction and frequency range and time response characteristics of the loop filter 74 may vary, although the overall design and operation will be understood by those skilled in the art. In general terms, however, in a computer disk drive environment, the loop filter will filter out relatively high frequency disturbances while increasing the response dynamics to anticipated low frequency disturbances. A resultant filter output signal 76 from the loop filter 74 is obtained and supplied to a modulator circuit 78.

The modulator circuit 78 is depicted in simplified form in FIG. 8. As shown, the filter output signal 76 is coupled as one input to a comparator 80, wherein this filter output signal comprises a filtered dc voltage having a magnitude representative of the frequency or phase error between the actual motor operation and the reference signal 28. A second comparator input comprises the output of an oscillator 82 designed to produce a generally triangular wave signal at an appropriate frequency of typically about 30 kilohertz, as depicted by the signal 83 in FIG. 9. The oscillator signal 83 is compared to the filter output signal 76 to provide an output motor control signal pulse whenever the filter signal 76 exceeds the oscillator signal 83. In effect, this produces a succession of pulses 84 (FIG. 9) defining a pulse width modulated control signal having a duty cycle related directly to the magnitude of the filter output signal 76. That is, as a phase lag error increases, the value of the signal 76 as derived from the analog error signal (FIG. 6) will decrease resulting in an increased duty cycle of the motor control signal. Conversely, an increase in phase lead error will result in an increase in the signal 76 for corresponding decrease in the motor control signal duty cycle. In the exemplary embodiment, a motor control signal of minimum duty cycle reflects phase and frequency lock between the spindle motor and the reference frequency. Duty cycle is the phase locked mode will be determined by system lossed, i.e., drag torque, windage, biases, etc. This pulse width modulated control signal is coupled from the modulator 78 to the commutation logic 36 (FIG. 2) for purposes of controlling motor operation by appropriate regulation of the power stage 32.

Figure 10:
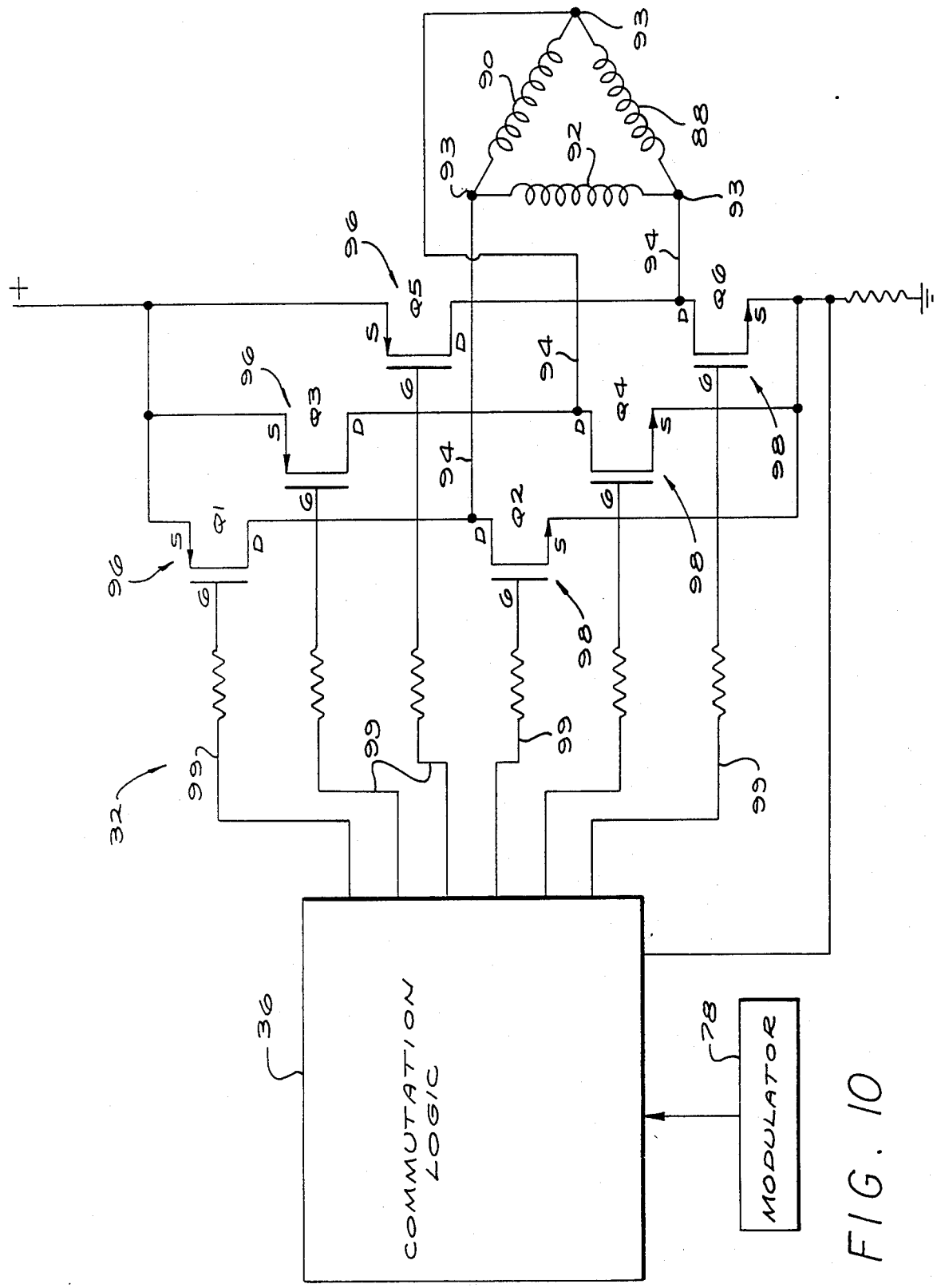
FIG. 10 is a general schematic circuit diagram illustrating motor commutation logic and associated power stage circuit for driving the spindle motor of a computer disk drive unit.

FIG. 10 illustrates the power stage 32 as controlled by the commutation logic 36 for driving the spindle motor 12. More particularly, the motor 12 has a typical three phase construction with three motor windings 88, 90 and 92 connected in a conventional manner, such as in a delta configuration as shown. Each junction 93 between an adjacent pair of windings is coupled via a power conductor 94 to a CMOS network coupled between a voltage source and ground, and controlled by the commutation logic 36, which preferably also comprises a CMOS type logic circuit. That is, each winding junction 93 is coupled via its associated conductor 94 to the drain of two MOSFETs 96 and 98, wherein the MOSFET 96 is of the "P" channel type with its source coupled to voltage source, and the MOSFET 98 is of the "N" channel type with its source coupled through a low valur resistance to ground. Accordingly, three "P" MOSFETs 96 and three "N" channel MOSFETs 98 are provided. The gates of all of these MOSFETs 96 and 98 are individually controlled by the commutation logic 36 through appropriate signal gate lines 99.

With the foregoing power stage arrangement, the commutation logic 36 provides close control of the spindle motor operation by regulating the time and sequence of gating of the MOSFETs. More particularly, for all three of the motor windings 88, 90 and 92, the commutation logic 36 appropriately gates the "P" channel MOSFETs 96 with negative pulses and the "N" channel MOSFETs 98 with positive pulses to switch those semiconductor devices to the "ON" state and permit current to flow from the voltage source through the motor windings to ground. As is known in the art for three phase dc motors, the timing and sequence of the gating operation, and in conjunction with pulse width modulated control, directly controls motor speed, phase and torque. Importantly, with the MOSFET type switches, the power stage 32 dissipates relatively little power and produces minimal heating due to minimal resistance, thereby permitting power- and space-efficient operation in a compact computer disk drive unit.

The phase and frequency locked operation of one spindle motor of a disk drive unit, as described above, can be utilized to obtain phase and frequency locked operation of two or more disk drive units for purposes of providing an enlarged computer data base. That is, additional disk drive units can be phase and frequency locked relative to the same reference signal, such that multiple disk drive units are phase and frequency locked with respect to each other. Alternately, the servo index pulses or the like obtained from one phase/frequency locked disk drive unit can be applied as the reference signal to additional disk drive units for achieving similar phase and frequency locked operation thereof. The end result, importantly, is that multiple disk drive units can be ganged together to emulate a significantly enlarged computer data base.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. A phase and frequency locked motor control system for controlling phase and frequency operation of a disk drive spindle motor, said system comprising:
    means for driving the spindle motor, said driving means including a motor power stage for supplying power to the motor, and a commutation logic for controlling operation of said power stage;
    means for generating a motor signal representative of motor rotating frequency and phase;
    means for generating a reference signal representative of a reference rotating frequency and phase;
    means for comparing said motor signal with said reference signal, said comparing means including means for generating an error signal representative of error between said motor signal frequency and phase and said reference signal frequency and phase;
    said comparing means comprising an error detector having means for generating a first output error signal when said motor signal frequency trails said reference signal frequency, a second output error signal when said motor signal frequency leads said reference signal frequency, a third output error signal when said motor signal frequency substantially matches said frequency signal frequency and said motor signal phase trails said reference signal phase, and a fourth output error signal when said motor signal frequency substantially matches said reference signal frequency and said motor signal phase leads said reference signal phase, said error detector generating said first through fourth output signals one at a time in accordance with frequency and phase of the motor signal relative to the reference signal; and
    means responsive to said error signal for generating a pulse width modulated motor control signal having a duty cycle representative of said error, and for coupling said motor control signal to said commutation logic for regulating operation of said power stage to drive the motor in phase and frequency locked relation with said reference signal.

2. The system of claim 1 wherein said first and second output error signals comprise substantially constant signals, and wherein said third and fourth output error signals comprise pulse width modulated signals.

3. The system of claim 1 wherein said comparing means further includes means for responding to the generated one of said first through fourth output error signals generated by said error detector for generating an analog error signal representative of said error between said motor signal frequency and phase and said reference signal frequency and phase.

4. The system of claim 3 wherein said means for generating said analog error signal includes means for sampling the generated one of said first through fourth output error signals generated by said error detector on a repetitive basis to generate said analog error signal.

5. The system of claim 4 wherein sampling means includes means for integrating the generated one of said first through fourth output signals generated by said error detector, a signal storage circuit, and switch means for repetitively coupling said storage circuit to said integrating means to transfer the signal integrated by said integrating means to said storage circuit.

6. The system of claim 5 wherein said storage circuit comprises a resistor-capacitor network having a storage capacitor coupled to a voltage divider, said voltage divider reducing the effects of noise on the signal transferred to said storage circuit.

7. The system of claim 4 wherein said means responsive to said error signal comprises means for modulating said analog error signal to produce said pulse width modulated motor control signal.

8. The system of claim 7 further including a loop filter for filtering said analog error signal for predetermined dynamic responsive characteristics to produce a filtered analog error signal, said modulating means modulating said filtered analog error signal.

9. The system of claim 1 wherein said power stage comprises a CMOS network including a plurality of MOSFETs gated individually by said commutation logic.

10. The system of claim 1 wherein said motor signal comprises a servo index pulse.

11. The system of claim 1 wherein said motor control system is provided with each of a plurality of disk drive spindle motors, said means for generating a reference signal comprising means for generating a common reference signal for said plurality of spindle motors.

12. A phase and frequency locked motor control system for controlling phase and frequency operation of a disk drive spindle motor, said system comprising:
   means for driving the spindle motor, said driving means including a motor power stage for supplying power to the motor, and a commutation logic for controlling operation of said power stage;
   means for generating a motor signal representative of motor rotating frequency and phase;
   means for generating a reference signal representative of a reference rotating frequency and phase;
   means for comparing said motor signal with said reference signal, said comparing means including means for generating an error signal representative of error between said motor signal frequency and phase and said reference signal frequency and phase;
   said comparing means comprising an error detector for generating a first output error signal representative of said motor signal leading said reference signal, and a second output error signal representative of said motor signal trailing said reference signal, said error detector generating said first and second output error signals one at a time, said comparing means further including an analog sample circuit including means for sampling and integrating the generated one of said first and second output error signals in a repetitive manner, a signal storage circuit, and means for transferring the signal integrated by said integrating means to said storage circuit to produce an analog error signal representative of said error
   means responsive to said analog error signal for modulating said analog error signal to produce a pulse width modulated motor control signal having a duty cycle representative of said error, and for coupling said motor control signal to said commutation logic for regulation operation of said power stage to drive the motor in phase and frequency locked relation with said reference signal.

13. The system of claim 12 wherein said storage circuit comprises a resistor-capacitor network having a storage capacitor coupled to a voltage divider, said voltage divider reducing the effects of noise on the signal transferred to said storage circuit.

14. A phase and frequency locked motor control system for controlling phase and frequency operation of a disk drive spindle motor, said system comprising:
   means for driving the spindle motor, said driving means including a motor, and a commutation logic for controlling operation of said power stage;
   means for generating a motor signal representative of motor rotating frequency and phase;
   means for generating a reference signal representative of a reference rotating frequency and phase;
   an error detector for receiving said motor signal and said reference signal and responding thereto to generate an output error signal representative of error between said motor signal frequency and/or phase and said reference signal frequency and/or phase, said output error signal comprising a first output error signal representative of said motor signal leading said reference signal and a second output error signal representative of said motor signal trailing said reference signal, said error detector generating said first and second output error signals one at a time;
   a sample circuit including means for sampling and integrating said output error signal to produce an analog error signal representative of said frequency and/or phase error; and
   a modulator circuit driven by said analog error signal to produce a pulse width modulated motor control signal having a duty cycle representative of said error, and for coupling said motor control signal to said commutation logic for regulating operation of said power stage to drive the motor in phase and frequency locked relation with said reference signal.

15. The system of claim 14 wherein said motor control system is provided with each of multiple disk drive spindle motors to operate said multiple motors in frequency and phase locked relation.

16. The system of claim 14 wherein said sampling and integrating means includes an integrator circuit for producing a ramp signal which changes as a time function in a first direction when said motor signal frequency and/or phase trails said reference signal, and in a second direction when said motor signal frequency and/or phase leads said reference signal.

17. The system of claim 16 wherein said sampling and integrating means further includes a signal storage circuit, and switch means for repetitively coupling said storage circuit to said integrating means for transfer the signal integrated by said integrating means for said storage circuit.

18. The system of claim 17 wherein said storage circuit comprises a resistor-capacitor network having a storage capacitor coupled to a voltage divider, said voltage divider reducing the effects of noise on the signal transferred to said storage circuit.

19. A phase and frequency locked motor control system for controlling phase and frequency operation of a disk drive spindle motor, said system comprising:
   means for driving the spindle motor, said driving means including a motor power stage for supplying power to the motor, and a commutation logic for controlling operation of said power stage;
   means for generating a motor signal representative of motor rotating frequency and phase;
   means for generating a reference signal representative of a reference rotating frequency and phase;
   an error detector circuit having first and second output ports, said error detector circuit including means for comparing said motor signal and said reference signal and responding thereto to produce an output error signal defined by a substantially constant output error signal at said first output port when said motor signal frequency trails said reference signal frequency, a pulse width modulated output error signal at said first output port and having a duty cycle representative of phase error when said motor signal frequency substantially matches said reference signal frequency and said motor signal phase trails said reference signal phase, a substantially constant output error signal at said second output port when said motor signal frequency leads said reference signal frequency, and a pulse width modulated output error signal at said second output port when said motor signal frequency substantially matches said reference signal frequency and said motor signal phase leads said reference signal phase;

an analog sample circuit including a first analog switch coupled to said first output port and a second analog switch coupled to said second output port, said first and second switches closing in response to said output error signal at the associated one of said output ports, integrator means for integrating and storing a charge in accordance with the time closure period of said analog switches, said charge defining an analog error signal; and means for modulating said analog error signal to produce a pulse width modulated motor control signal having a duty cycle representative of error between said motor and reference signals, and for coupling said motor control signal to said commutation logic for regulating operation of said power stage to drive the motor in phase and frequency locked relation with said reference signal.

20. A method of controlling phase and frequency operation of a disk drive spindle motor having a motor power stage circuit for supplying power to the motor and a commutation logic circuit for controlling operation of said power stage circuit, said method comprising:

generating a motor signal representative of motor rotating frequency and phase;

generating a reference signal representative of a reference rotating frequency and phase;

comparing said motor signal and said reference signal and for generating in response thereto an output error signal representative of error between the motor signal and the reference signal;

said comparing step including the steps of generating a first output error signal when said motor signal frequency trails said reference signal frequency, a second output error signal when said motor signal frequency leads said reference signal frequency, a third output error signal when said motor signal frequency substantially matches said reference signal frequency and said motor signal phase trails said reference signal phase, and a fourth output error signal when said motor signal frequency substantially matches said reference signal frequency and said motor signal phase leads said reference signal phase, said error signal generating step including generating the first through fourth output signals one at a time in accordance with the frequency and phase of the motor signal relative to the reference signal;

converting the output error signal to a pulse width modulated motor control signal having a duty cycle representative of said error; and coupling the motor control signal to the commutation logic circuit for regulating operation of said power stage circuit to drive the motor in phase and frequency locked relation with the reference signal.

21. The method of claim 20 wherein said comparing step comprises generating a digital output error signal representative of frequency and phase error between the motor signal and the reference signal, converting the digital output error signal to an analog error signal, and converting the analog error signal to the pulse width modulated motor control signal.

22. The method of claim 20 wherein said first and second output error signals comprise substantially constant signals, and wherein said third and fourth output error signals comprise pulse width modulated signals.

23. The method of claim 20 wherein said comparing step further includes responding to the generated one of said first through fourth output error signals for generating an analog error signal representative of said error between said motor signal frequency and phase and said reference signal frequency and phase.

24. The method of claim 23 wherein said step of generating the analog error signal sampling the generated one of said first through fourth output error signals on a repetitive basis to generate said analog error signal.

25. The method of claim 24 wherein sampling step includes integrating the generated one of said first through fourth output signals, and transferring the resultant integrated signal to a signal storage circuit.

26. The method of claim 20 including the step of supplying a common reference signal to multiple disk drive spindle motors.

27. A method of controlling phase and frequency operation of a disk drive spindle motor having a motor power stage circuit for supplying power to the motor, and a commutation logic circuit for controlling operation of said power stage circuit, said method comprising:

generating a motor signal representative of motor rotating frequency and phase;

generating a reference signal representative of a reference rotating frequency and phase;

comparing said motor signal and said reference signal and for generating in response thereto an output error signal representative of error between the motor signal and the reference signal;

converting the output error signal to a pulse width modulated motor control signal having a duty cycle representative of said error; and coupling the motor control signal to the commutation logic circuit for regulating operation of said power stage circuit to drive the motor in phase and frequency locked relation with the reference signal;

said comparing step comprising generating one at a time a first output error signal representative of the motor signal leading the reference signal, and a second output error signal representative of the motor signal trailing the reference signal, said comparing step further including sampling and integrating the generated one of said first and second output error signals in a repetitive manner, and transferring the resultant integrated signal to a signal storage circuit to produce an analog error signal representative of the error between the motor and reference signals.

28. The method of claim 27 wherein said converting step comprises pulse width modulating the analog error signal.

29. A method of controlling phase and frequency operation of a disk drive spindle motor having a motor power stage circuit for supplying power to the motor, and a commutation logic circuit for controlling operation of said power stage circuit, said method comprising:

generating a reference signal representative of motor rotating frequency and phase;

generating a reference signal representative of a reference rotating frequency and phase;

comparing the motor signal and the reference signal and responding thereto to generate an output error signal representative of error between the motor signal and the reference signal, said comparing step comprising the steps of generating one at a time a first output error signal representative of the motor signal leading the reference signal and a second output error signal representative of the motor signal trailing the reference signal;

sampling and integrating the output error signal to produce an analog error signal representative of said error;

pulse width modulating the analog error signal to produce a pulse width modulated motor control signal having a duty cycle representative of the error; and coupling the motor control signal to said commutation logic circuit for regulating operation of said power stage circuit to drive the motor in phase and frequency locked relation with the reference signal.

30. The method of claim 29 wherein said sampling and integrating step includes producing a ramp signal which changes as a time function in a first direction when the motor signal trails the reference signal, and in a second direction when the motor signal leads the reference signal.

* * * * *